United States Patent [19]

Maida

[11] 3,794,430

[45] Feb. 26, 1974

[54] EXPOSURE METER HAVING MEANS FOR PREVENTING ERRONEOUS METERING

[75] Inventor: Osamu Maida, Tokyo, Japan

[73] Assignee: Nippon Kogaku K.K., Tokyo, Japan

[22] Filed: Aug. 21, 1972

[21] Appl. No.: 282,171

[30] Foreign Application Priority Data
Sept. 2, 1971 Japan................................ 46-78862

[52] U.S. Cl................. 356/226, 324/29.5, 356/227
[51] Int. Cl............................. G01j 1/44, G01j 1/42
[58] Field of Search ............ 356/226, 227; 324/29.5

[56] References Cited
UNITED STATES PATENTS

| | | | |
|---|---|---|---|
| 3,552,862 | 1/1971 | Weinberg............................ | 356/226 |
| 3,157,870 | 11/1964 | Marino et al. ..................... | 324/29.5 |
| 2,971,432 | 2/1961 | Blank................................. | 324/29.5 |

*Primary Examiner*—Ronald L. Wibert
*Assistant Examiner*—V. P. McGraw
*Attorney, Agent, or Firm*—Fitzpatrick, Cella, Harper & Scinto

[57] ABSTRACT

An exposure meter comprises exposure detecting means connected with an electric power source and including a photoelectric element, means connected with the photoelectric element to introduce exposure influencing factors thereinto, and means connected with the photoelectric element and with the introducing means to produce a proper exposure signal. Indicating means is connected with the exposure detecting means and operable to indicate a proper exposure in response to the proper exposure signal. Means is connected between the exposure detecting means and the indicating means to render the indicating means inoperable for any voltage drop of the source voltage below the minimum usable voltage.

8 Claims, 3 Drawing Figures

EXPOSURE METER HAVING MEANS FOR PREVENTING ERRONEOUS METERING

BACKGROUND OF THE INVENTION

1. Field of the Invention

This invention relates to exposure meters employing a signal display to indicate the propriety of the exposure, and more particularly to such exposure meters which have means for preventing erroneous metering resulting from a source voltage drop.

2. Description of the Prior Art

Exposure measurement, when effected with the source voltage for an exposure meter circuit reduced below the minimum usable voltage level, results in erroneous measurements. To avoid such error, means have been employed for checking the source voltage. One of the known methods of checking the source voltage has comprised the use of a source voltage checking circuit in addition to an exposure meter circuit so as to check the source voltage by means of a signal such as a light signal, or a meter directed exclusively to such purpose. Another known method of checking the source voltage has comprised changing over the exposure indicating signal light in an exposure meter to a source voltage checking circuit so that the signal light may be used as the means for checking the source voltage. In the former method, generally, the source voltage checking circuit is opened and closed to check the source voltage by means of a switch used exclusively for such purpose every time the source voltage is to be checked.

When any of the described methods is used to check up the source voltage, it has been required to open and close or change over the source voltage checking circuit, thereby to check the source voltage discretely or independently of the exposure display accomplished by the exposure meter. Thus, one would not know when the source voltage has dropped below the minimum usable voltage level during the use of the exposure meter, and yet it is very cumbersome and practically impossible to check the source voltage at all times. Moreover, one would often neglect to check the source voltage before he uses the exposure meter.

For these reasons, the conventional exposure meters of the described type have unavoidably encountered a disadvantage in that a picture is taken with improper exposure when the exposure is measured with the source voltage reduced below the minimum usable voltage level, but without such voltage reduction being noticed.

SUMMARY OF THE INVENTION

I have conceived an exposure meter which avoids any erroneous exposure measurement which would result from a reduction in the source voltage.

One aspect of the present invention resides in the provision of an exposure meter which cannot indicate a proper exposure whenever the source voltage has dropped below the minimum usable voltage level.

As another aspect of the present invention, I provide an exposure meter which is adapted to indicate the impossibility of exposure measurement when the source voltage has dropped below the minimum usable voltage level.

The exposure meter, according to the present invention, comprises an electric power source and exposure detecting means connected with the electric power source. The exposure detecting means includes a photoelectric element for receiving light from an object to be photographed, means connected with the photoelectric element to introduce exposure influencing factors thereinto, and means connected with the photoelectric element and with the introducing means to produce a proper exposure signal when the intensity of the light from the object and the exposure influencing factors provide a proper exposure. Indicating means is connected with the exposure detecting means and are operable to indicate a proper exposure in response to the proper exposure signal from the exposure detecting means. Means are connected between the exposure detecting means and the indicating means to render the indicating means inoperative when the voltage of the electric power source has dropped below the minimum usable voltage level. The means for rendering the indicating means inoperative includes at least one voltage divider connected between the opposite terminals of the electric power source and at least one transistor having the collector thereof connected with one terminal of the electric power source via the indicating means. The emitter of the transistor is connected with the other terminal of the electric power source, and the base of the transistor is connected with the voltage divider so that when the electric power source is at the minimum usable voltage level, the voltage divided by the voltage divider and applied to the base of the transistor is slightly higher than the threshold voltage between the base and emitter of the transistor.

According to a further feature of the present invention, the signal producing means of the exposure detecting means may comprise first and second signal producing means. The first signal producing means may produce a first signal when the combination of the light intensity and the exposure influencing factors correspond to a proper exposure value or an under-exposure value. The second signal producing means may produce a second signal when the said combination corresponds to a proper exposure value or an over-exposure value.

The indicating means may comprise first and second indicators. The first indicator is connected with the first signal producing means and is operable in response to the first signal. The second indicator is connected with the second signal producing means and operable in response to the second signal. The means for rendering the indicating means inoperative may include first and second voltage dividers and first and second transistors. The first voltage divider and the first transistor are connected between the first signal producing means and the first indicator. The second voltage divider and the second transistor are connected between the second signal producing means and the second indicator. Thus, the operation of the first indicator alone indicates an under-exposure, the operation of the second indicator alone indicates a proper exposure, and the inoperativeness of both indicators indicates that the source voltage is lower than the minimum usable voltage level.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

A specific embodiment of the invention has been chosen for purposes of illustration and description, and is shown in the accompanying drawings, forming a part of the specification, wherein.

DESCRIPTION OF THE PREFERRED EMBODIMENTS

Figure 1:
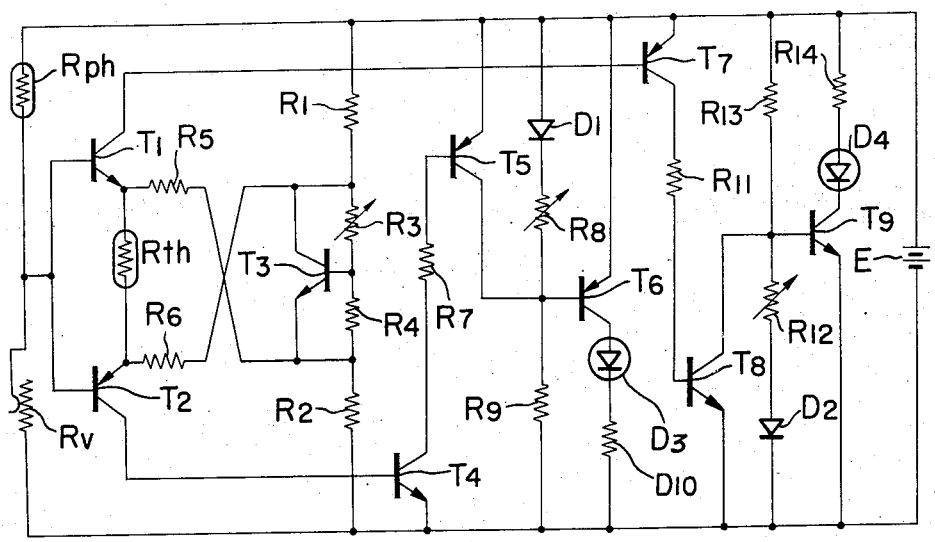
FIG. 1 is a circuit diagram showing the exposure indicating and source voltage checking circuit according to an embodiment of the present invention.

Referring to FIG. 1, R$ph$ designates a photoelectric element such as a CdS cell. R$v$ designates a function resistor whose characteristic is determined by the illumination vs. resistance value characteristic of the photoelectric element R$ph$ and by a mechanical interlocking system with a mechanism for setting film sensitivity, shutter time, F-number, etc. Exposure adjusting factors such as film sensitivity, shutter time, F-number are to be introduced into the function resistor R$v$. Resistors R1 and R2 cooperate with the photoelectric element R$ph$ and the function resistor R$v$ to constitute a bridge circuit. The photoconductive element R$ph$ and the function resistor R$v$ are serially connected together. One end of the element R$ph$ is connected with the positive terminal of an electric power source E and one end of the resistor R$v$ is connected with the negative terminal of the electric power source E. The mid-point between R$ph$ and R$v$ is connected with the bases of NPN and PNP transistors T1 and T2, respectively, which serve as bridge balance detecting transistors. Resistor R1, semi-fixed resistor R3, resistor R4 and resistor R2 are serially connected together. One end of the resistor R1 is connected with the positive terminal of the electric power source E and one end of the resistor R2 is connected with the negative terminal of the source E.

A bias NPN transistor T3 has its collector connected with the point of connection between the resistor R1 and the semi-fixed resistor R2, has its base connected with the point of connection between the resistors R3 and R4, and has its emitter connected with the point of connection between the resistors R4 and R2. The emitter of the transistor T1 is connected with the point of connection between the resistors R4 and R2 through a resistor R5. The emitter of the transistor T2 is connected with the point of connection between the resistor R1 and the semi-fixed resistor R3 through a resistor R6.

The resistors R5 and R6 are equal in resistance value. Connected between the emitter of the transistor T1 and the emitter of the transistor T2 is a thermistor R$th$, which cooperates with the resistors R5 and R6 to compensate for the temperature in the insensitive zone width (i.e., the tolerance for the indication of proper exposure) provided by the transistors T1 and T2. The semi-fixed resistor R3 is pre-adjusted so that the bias voltage between the emitters of the transistors T1 and T2 may equal the voltage across the optimum insensitive zone width. The collector of the transistor T2 is connected with the base of NPN transistor T4, whose emitter is connected with the negative terminal of the electric power source E and whose collector is connected with the base of PNP transistor T5 through a resistor R7. The emitter and collector of the transistor T5 are connected with the positive terminal of the power source E and the base of PNP transistor T6, respectively. The transistors T5 and T6 together constitute a phase inverter circuit.

The emitter and collector of the transistor T6 are connected with the positive terminal of the electric power source E and the anode of luminous diode D3, respectively. The cathode of the diode D3 is connected with the negative terminal of the electric power source E through a resistor R10. The anode and cathode of diode D1 are connected with the positive terminal of the electric power source E and a semi-fixed resistor R8, respectively. One end of the resistor R8 is connected with a resistor R9, one end of which, in turn, is connected with the negative terminal of the electric power source E. The point of connection between the resistor R9 and the semi-fixed resistor R8 is connected with the base of transistor T6 to apply a forward bias to this transistor. The divided voltage determined by the resistor R9, semi-fixed resistor R8 and diode D1 with respect to the voltage of the source E is adjusted so that it is slightly higher than the threshold voltage between the base and emitter of the transistor T6 when the source E is at the minimum usable voltage level. Consequently, when the source E is below the minimum usable voltage level, the transistor T6 is non-conductive irrespective of the conductive or non-conductive state of the transistor T5, thus maintaining the luminous diode D3 turned off at all times.

The diode D1 is a germanium diode used for temperature compensation and it compensates for the variation of the check point of the source voltage which would result from the fact that the threshold voltage between the base and emitter of the transistor T6 varies with temperature. Similarly, the collector of the transistor T1 is connected with the base of PNP transistor T7, whose emitter is connected with the positive terminal of the electric power source E and whose collector is connected with the base of NPN transistor T8 through a resistor R11. The emitter and collector of the transistor T8 are connected with the negative terminal of the electric power source E and the base of NPN transistor T9, respectively. The transistors T8 and T9 together constitute a phase inverter circuit. The emitter and collector of the transistor T9 are connected with the negative terminal of the power source E and the cathode of luminous diode D4, respectively. The anode of the luminous diode D4 is connected with the positive terminal of the electric power source E through a resistor R14. The cathode of the temperature compensating germanium diode D2 is connected with the negative terminal of the electric power source E and the anode thereof is connected with a semi-fixed resistor R12. One end of the resistor R12 is connected with a resistor R13, one end of which, in turn, is connected with the positive terminal of the electric power source E. The point of connection between the resistor R13 and the semi-fixed resistor R12 is connected with the base of transistor T9 to apply a forward bias to this transistor. The resistor R13, the semi-fixed resistor R12, diode D2 and transistor T9 cooperate together to perform the source voltage checking function in the same way as described above with respect to the resistor R9, semi-fixed resistor R8, diode D1 and transistor T6.

The operation of the exposure meter shown in FIG. 1 will now be described with respect to under-exposure, over-exposure and proper exposure, and with the understanding that the electric power source E is at the normal voltage level.

In the case of under-exposure (i.e., when the quantity of light incident on the photoelectric element R$ph$ which is designated by the resistance value of the function resistor R$v$ determined by a combination of exposure adjusting factors is greater than the actual quantity of incident light from the object), the resistance value of the element R$ph$ is higher than that during the balance of the bridge, so that the base voltages of transistors T2 and T1 are reduced. When these base voltages drop a predetermined value below the reference voltage determined by the bias voltage applied to the emitter of transistor T2 (said predetermined value corresponds to the base-emitter voltage necessary for the transistor T2 to conduct), the transistor T2 becomes conductive. The collector current of the transistor T2 is amplified by the transistor T4 and passed to the transistor T5, which is thus rendered conductive. This conductivity of the transistor T5 equalizes the base voltage of the transistor T6 with the emitter voltage thereof, and thus the transistor T6 becomes non-conductive. On the other hand, the transistor T1 is being oppositely biased and accordingly non-conductive. The transistor T9 is biased into conductive state by the resistor R13. Thus, no current flows to turn on the diode D3, but a current flows to turn on the diode D4. The turn-on of the diode D4 alone indicates that the combination of exposure adjusting factors such as aperture diameter, shutter time, etc., corresponds to an under-exposure. Therefore, adjustment to a proper exposure can be achieved by moving the combination of exposure adjusting factors in the direction toward over-exposure, or more directly, in the direction for increasing the value of R$v$.

In the case of over-exposure (i.e., when the quantity of light incident on the photoelectric element R$ph$ which is designated by the resistance value of the function resistor R$v$ determined by the combination of exposure adjusting factors is smaller than the actual quantity of incident light), the resistance value of the element R$ph$ is lower than that during the balance of the bridge, so that the base voltages of the transistors T2 and T1 are increased. When these base voltages rise a predetermined value above the reference voltage determined by the bias voltage applied to the emitter of the transistor T1 (the predetermined value corresponds to the base-emitter voltage necessary for the transistor T1 to conduct), the transistor T1 becomes conductive. The collector current of the transistor T1 is amplified by the transistor T7 and is passed to the transistor T8, which is thus rendered conductive. This conductivity of the transistor T8 equalizes the base voltage of the transistor T9 with the emitter voltage thereof, and thus the transistor T9 becomes non-conductive. On the other hand, the transistor T2 is being oppositely biased and accordingly non-conductive, thus rendering the transistors T4 and T5 non-conductive. The transistor T6 is biased into conductive state by the resistor R9. Thus, no current flows to turn on the diode D4, but a current flows to turn on the diode D3. The turn-on of the diode D3 alone indicates that the combination of exposure adjusting factors such as aperture diameter, shutter time, etc., corresponds to an over-exposure. Therefore, adjustment to a proper exposure can be achieved by moving the combination of exposure adjusting factors in the direction toward under-exposure, or more directly, in the direction for decreasing the value of R$v$.

In the case of proper exposure (i.e., when the quantity of light incident on the photoelectric element R$ph$ which is designated by the resistance value of the function resistor R$v$ determined by the combination of exposure adjusting factors is equal to the actual quantity of incident light), no base current flows to transistors T1 and T2 and these transistors are both non-conductive, thus rendering the transistors T4, T5, T7 and T8 non-conductive. Consequently, the transistors T6 and T9 are rendered conductive to turn on both diodes D3 and D4, which indicates that the combination of exposure adjusting factors corresponds to a proper exposure.

When the electric power source E is at normal voltage level, as described above, the luminous diodes D3 or D4 may be turned on or off through the transistors T6 and T9 in accordance with the state of the transistors T5 and T8, and thus one or both of the two luminous diodes D3 and D4 are always turned on irrespective of under-, over- or proper exposure. However, when the electric power source E is lower than the minimum usable voltage level, as described previously, the divided voltage determined by the resistors R9, R13, semi-fixed resistors R8, R12 and diodes D1, D2 becomes lower than the threshold voltage between the base and emitter of the transistors T6 and T9, so that these transistors are always non-conductive irrespective of the state of the transistors T5 and T8, thus turning off both diodes D3 and D4. In other words, once the source voltage has dropped below the minimum usable voltage level, the exposure meter avoids any erroneous indication of proper exposure which would otherwise result from the source voltage drop, irrespective of any regulation of the variable resistor R$v$. Further, the source voltage drop below the minimum usable voltage level can be recognized.

Figure 2:
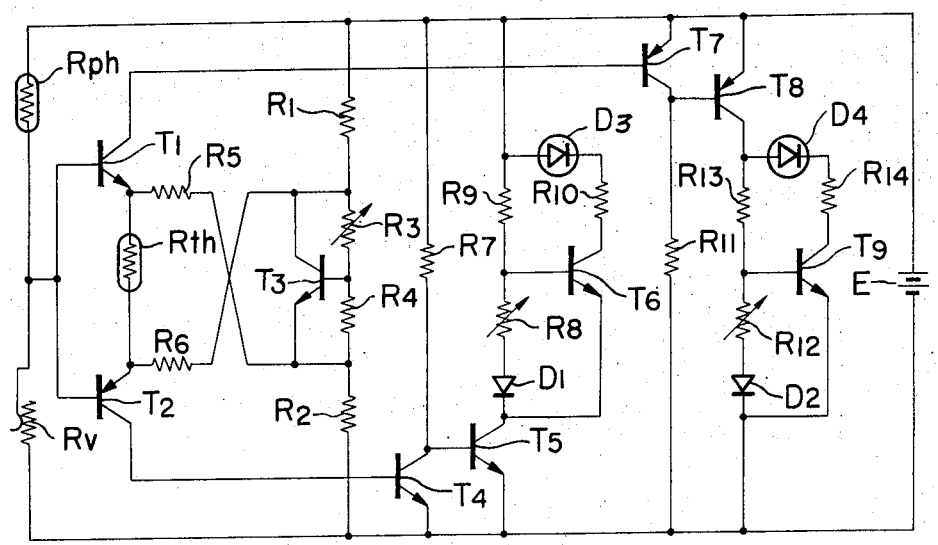
FIG. 2 is a circuit diagram showing a second embodiment of the present invention.

FIG. 2 shows another embodiment which is similar in operation to the embodiment of FIG. 1. These two embodiments differ in the following points. In FIG. 1, transistors T6, T5 and T9, T8 are parallel-connected together to provide a phase inversion and a switching control for diodes D3 and D4, and transistors T6 and T9 also constitute a source voltage checking circuit. In FIG. 2, transistors T5, T6 and T8, T9 are serially connected and phase inversion may be effected between transistors T4 and T5 and between transistors T7 and T8, respectively. Transistors T5 and T8 also constitute a switching control circuit for luminous diodes D3 and D4, and transistors T6 and T9 constitute a source voltage checking circuit alone. The switching of the luminous diodes D3 and D4 as an exposure meter (when the electric power source E is at the normal voltage level) is similar to the case of FIG. 1. That is, D4 turns on to indicate an under-exposure, D3 turns on to indicate an over-exposure, and both D3 and D4 turn on to indicate a proper exposure. When the source voltage becomes lower than the minimum usable voltage level, both diodes D3 and D4 turn off to indicate such voltage drop.

Figure 3:
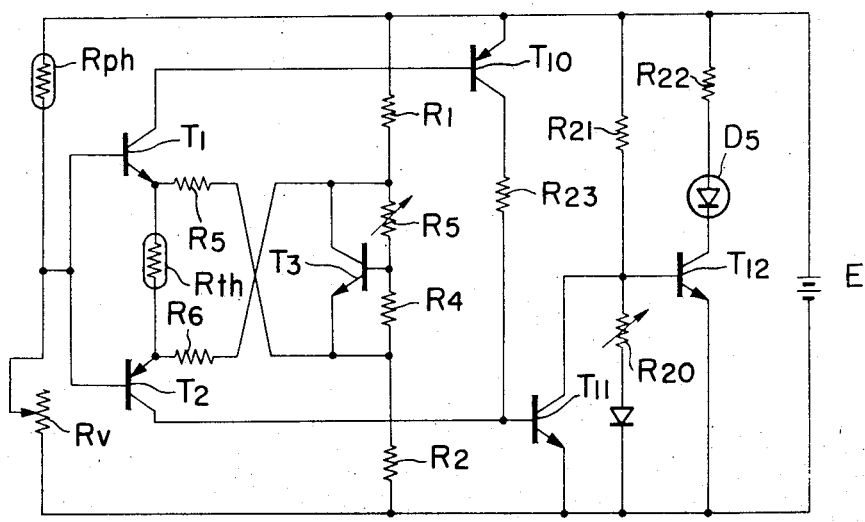
FIG. 3 is a circuit diagram showing a third embodiment of the present invention.

In the embodiments described hitherto, luminous diodes are used as signal light means, but they may be replaced by incandescent lamps or the like to provide the same circuit operation as that described above. Although these embodiments have been described with respect to an exposure meter having two signal light means (such as luminous diodes, incandescent lamps or the like), it will be apparent that the number of signal light means is not limited to two, but the invention is also applicable to any exposure meter of the described type which has at least one signal light means. Such an embodiment is illustrated in FIG. 3.

In this alternative embodiment, the base and emitter of transistor T10 are connected with the collector of transistor T1 and the positive terminal of the electric power source E, respectively, and the collector of the transistor T10 is connected through resistor R23 with the base of transistor T11, to which is also connected the collector of transistor T2. The emitter of transistor T11 is connected with the negative terminal of the electric power source E and the collector thereof is connected with the point of connection between resistors R20 and R21. These resistors R20 and R21 perform the same functions as a voltage divider (i.e., the resistors R8 and R9 of FIGS. 1 and 2, the resistors R12 and R13 of FIGS. 1 and 2) described previously. The base of transistor T12 is connected with the point of connection between the resistors R20 and R21; the emitter thereof is connected with the negative terminal of the electric power source E; and the collector thereof is connected with the positive terminal of the source E through luminous diodes D5 and resistor R22.

The circuit of the present embodiment operates in the manner described hereunder. In the case of proper exposure, both of transistors T1 and T2 are non-conductive and accordingly transistor T11 is non-conductive, thus rendering transistor T12 conductive to turn on luminous diode D5.

In the case of improper exposure (under or over-exposure), one of transistors T1 and T2 is conductive and accordingly transistor T11 is also conductive, thus rendering transistor T12 non-conductive to turn off luminous diode D5. In other words, diode D5 turns on for proper exposure and turns off for improper exposure. Whenever the source voltage drops below the minimum usable voltage level, the base-emitter voltage of transistor T12 becomes lower than the threshold voltage, as in the first and second embodiments, so that the diode D5 never turns on irrespective of the state of the transistors T1 and T2.

Thus, according to the present invention, it is possible to avoid any erroneous exposure measurement which is attributable to the drop of the source voltage below the minimum usable voltage level and thus to obviate any improper picture-taking which may result from such erroneous measurement. Furthermore, especially in the first and second embodiments, the signal light means serve both to indicate the appropriateness or inappropriateness of exposure and to check the source voltage, and this eliminates the need for any special operation (such as the change-over of the exposure meter circuit and the source voltage checking circuit or the switching of the switch for the source voltage checking circuit, as was required in the conventional exposure meters) in order to measure the exposure and check up the source voltage at the same time.

Therefore, as soon as the source voltage becomes lower than the minimum usable voltage level during exposure measurement, such voltage drop can be recognized without the cumbersome procedure of checking the source voltage from time to time through some special operation as was the case with the conventional exposure meters, thus overcoming the disadvantage that the check of the source voltage may be neglected inadvertently.

Unlike the conventional exposure meters of similar type, the present invention also eliminates the necessity of providing additional means such as switching means for the source voltage checking circuit or change-over means for changing over the signal light between the exposure meter circuit and the source voltage checking circuit, and this leads to the simplicity, readiness and economy with which the entire exposure meter is assembled as a unit.

I believe that construction and operation of my novel exposure meter will now be understood and that its advantages will be fully appreciated by those persons skilled in the art.

I claim:

1. An exposure meter comprising, exposure detecting means including a photoelectric element, an electric power source, means connected with said photoelectric element to introduce exposure influencing factors thereinto, means connected with said photoelectric element and with said introducing means to produce a proper exposure signal, indicating means connected with said exposure detecting means and operable to indicate a proper exposure in response to a proper exposure signal, and means connected between said exposure detecting means and said indicating means to render said indicating means inoperable upon a predetermined condition of said source voltage, said signal producing means of said exposure detecting means comprising first and second signal producing means, said first signal producing means producing a first signal when the combination of said light intensity and said exposure influencing factors correspond to a proper exposure or an under-exposure, said second signal producing means producing a second signal when said combination corresponds to a proper exposure or an over-exposure; said indicating means comprising first and second indicators, said first indicator being connected with said first signal producing means and operable in response to said first signal, said second indicator being connected with said second signal producing means and operable in response to said second signal; said means for rendering said indicating means inoperative including first and second voltage dividers and first and second transistors, said first voltage divider and said first transistor being connected between said first signal producing means and said first indicator, said second voltage divider and said second transistor being connected between said second signal producing means and said second indicator, whereby the operation of said first indicator alone indicates an under-exposure, the operation of said second indicator alone indicates an over-exposure, the operation of both said indicators indicates a proper exposure, and the inoperativeness of both said indicators indicates that said source voltage is lower than the minimum usable voltage level.

2. An exposure meter comprising:

an electric power source;

exposure detecting means connected with said electric power source and including a photoelectric element for receiving light from an object to be photographed, means connected with said photoelectric element to introduce exposure influencing factors thereinto, and means connected with said photoelectric element and with said introducing means to produce a proper exposure signal when the intensity of the light from the object and the exposure influencing factors provide a proper exposure;

indicating means connected with said exposure detecting means and operable to indicate a proper exposure in response to said proper exposure signal from said exposure detecting means;

means connected between said exposure detecting means and said indicating means to render said indicating means inoperative when the voltage of said electric power source has dropped below the minimum usable voltage level, said means for rendering said indicating means inoperative including at least one voltage divider connected between the opposite terminals of said electric power source, and at least one transistor having the collector thereof connected with one terminal of said electric power source via said indicating means, the emitter of said transistor being connected with the other terminal of said electric power source, the base of said transistor being connected with said voltage divider so that when said electric power source is at the minimum usable voltage level the voltage divided by said voltage divider and applied to said base is slightly higher than the threshold voltage between the base and emitter of said transistor.

3. An exposure meter according to claim 2, wherein said signal producing means of said exposure detecting means comprises first and second signal producing means, said first signal producing means producing a first signal when the combination of said light intensity and said exposure influencing factors correspond to a proper exposure or an under-exposure, said second signal producing means producing a second signal when said combination corresponds to a proper exposure or an over-exposure; wherein said indicating means comprises first and second indicators, said first indicator being connected with said first signal producing means and operable in response to said first signal, said second indicator being connected with said second signal producing means and operable in response to said second signal; and wherein said means for rendering said indicating means inoperative includes first and second voltage dividers and first and second transistors, said first voltage divider and said first transistor being connected between said first signal producing means and said first indicator, said second voltage divider and said second transistor being connected between said second signal producing means and said second indicator, whereby the operation of said first indicator alone indicates an under-exposure, the operation of said second indicator alone indicates an over-exposure, the operation of both said indicators indicates a proper exposure, and the inoperativeness of both said indicators indicates that said source voltage is lower than the minimum usable voltage level.

4. An exposure meter comprising:

an electric power source;

a bridge circuit having a photoelectric element for receiving light from an object to be photographed, a variable resistor serially connected to said photoelectric element for introducing exposure influencing factors, and two resistors serially connected to each other, said serially connected variable resistor and element being connected in parallel to said serially connected two resistors with respect to said source, said bridge circuit being adapted to be balanced when the resistance values of said element and said variable resistor correspond to a proper exposure, and to be un-balanced when the resistance values of said element and said variable resistor correspond to an improper exposure;

a balance detecting circuit connected to said bridge circuit to produce a first signal upon balancing of the bridge circuit;

indicating means connected to said balance detecting means, said indicating means being operable by said first signal to indicate the proper exposure; and means connected between said balance detecting means and said indicating means for rendering said indicating means inoperative when the voltage of said power source has dropped below the minimum usable voltage level, said rendering means including at least one voltage divider connected across the power source, and at least one transistor whose collector is connected to one terminal of said power source through said indicating means, whose emitter is connected to the other terminal of said power source, and whose base is connected to said voltage divider so that when said power source is at the minimum usable voltage level, the voltage divided by said voltage divider and applied to said base is slightly higher than the threshold voltage between the base and emitter of said transistor.

5. An exposure meter according to claim 4, wherein said balance detecting circuit includes a first transistor and a second transistor complementary to said first transistor, both said first and second transistors being non-conductive upon balancing of said bridge circuit, either one of the first or second transistors being non-conductive upon un-balancing of the bridge circuit, said non-conductivity of both said first and second transistors serving to provide said first signal;

said indicating means includes a first indicator connected to said first transistor and a second indicator connected to said second transistor, both said first and second indicators being operable to indicate the proper exposure when both said first and second transistors are non-conductive, either one of said first or second indicators being operable to indicate an improper exposure when either one of said first or second transistors is non-conductive; and said rendering means includes first and second voltage dividers and third and fourth transistors, said first voltage divider and said third transistor being connected to said first transistor and said first indicator, said second voltage divider and said fourth transistor being connected to said second transistor and said second indicator, whereby the inoperativeness of both said indicators indicates that said source voltage is lower than the minimum usable voltage level.

6. An exposure meter comprising:

an electric power source;

exposure detecting means connected with said electric power source and including a photoelectric element for receiving light from an object to be photographed, means connected with said photoelectric element to introduce exposure influencing factors thereinto, and means connected with said photoelectric element and with said introducing means to produce a proper exposure signal when the intensity of the light from the object and the exposure influencing factors provide a proper exposure;

indicating means for indicating a proper exposure in response to said proper exposure signal;

means (R8, R9; R12, R13; R20, R21) connected to said electric power source for detecting the voltage of said power source, said voltage detecting means producing a voltage signal when the source voltage is higher than the minimum usable voltage of the power source; and control means (T5, T6; T8, T9; T11, T12) having two input terminals, one of which (base of T11) is connected to said exposure detecting means and the other of which (base of T12) is connected to said voltage detecting means, and an output terminal (collector of T12) connected to said indicating means for controlling said indicating means, said control means rendering said indicating means operative to indicate a proper exposure only when said control means receives both of said proper exposure signal and said voltage signal.

7. An exposure meter according to claim 6, wherein said signal producing means of said exposure detecting means comprises first and second signal producing means, said first signal producing means producing a first exposure signal when the combination of said light intensity and said exposure influencing factors correspond to a proper exposure or an under-exposure, said second signal producing means producing a second exposure signal when said combination corresponds to a proper exposure or an over-exposure; wherein said indicating means comprises first and second indicators; wherein said voltage detecting means comprises first and second voltage detecting means; and wherein said control means comprises first and second control means, said first control means having two input terminals, one of which is connected to said first voltage detecting means and the other of which is connected to said first signal producing means and having an output terminal connected to said first indicator, said second control means having two input terminals, one of which is connected to said second voltage detecting means and the other of which is connected to said second signal producing means and having an output terminal connected to said second indicator, said first control means rendering said first indicator operative only when said first control means receives both of said first exposure signal and said voltage signal, said second control means rendering said second indicator operative only when said second control means receives both of said second exposure signal and said voltage signal, whereby the operation of said first indicator alone indicates an under-exposure, the operation of said second indicator alone indicates an over-exposure, the operation of both said indicators indicates a proper exposure, and the inoperativeness of both said indicators indicates that said source voltage is lower than the minimum usable voltage level.

8. An exposure meter comprising:

an electric power source;

exposure detecting means connected to said power source and including a photoelectric element for receiving light from an object to be photographed, means connected with said photoelectric element to introduce exposure influencing factors thereinto, and means connected with said photoelectric element and with said introducing means to produce a proper exposure signal when the combination of the intensity of the light from the object and the exposure influencing factors provides a proper exposure, an over-exposure signal when the combination provides an over-exposure and an under-exposure signal when the combination provides an under-exposure;

indicating means operable to indicate a proper exposure, an under-exposure and an over-exposure in response to said proper exposure signal, said under-exposure signal and said over-exposure signal, respectively;

means connected to said electric power source for detecting the voltage of said power source, said voltage detecting means producing a first voltage signal when the voltage of said power source is higher than the minimum usable voltage of said power source and a second voltage signal when the voltage of said power source is below said minimum usable voltage;

and control means having an output terminal connected to said indicating means for controlling said indicating means and having two input terminals, one of which is connected to said exposure detecting means and the other of which is connected to said voltage detecting means, said control means rendering said indicating means operative to indicate a proper exposure when said control means receives both said proper exposure signal and said first voltage signal, to indicate an under-exposure when said control means receives both said under-exposure signal and said first voltage signal, and to indicate an over-exposure when said control means receives both said over-exposure signal and said first voltage signal, whereby when said control means receives said second voltage signal said indicating means is rendered inoperative to indicate that said source voltage is below the minimum usable voltage level.

* * * * *